United States Patent [19]

Meri

[11] 4,319,091
[45] Mar. 9, 1982

[54] DIAL PULSE RESTORER
[75] Inventor: Kalju Meri, Maspeth, N.Y.
[73] Assignee: Dictaphone Corporation, Rye, N.Y.
[21] Appl. No.: 84,766
[22] Filed: Oct. 15, 1979
[51] Int. Cl.³ .................. H04Q 1/36; H04M 11/10
[52] U.S. Cl. .................. 179/16 EA; 179/2 A; 179/6.09; 179/6.15
[58] Field of Search ............... 179/6 E, 16 E, 16 EA, 179/16 EC, 100.1 VC, 2 A, 6.07, 6.08, 6.09, 6.1, 6.15

[56] References Cited
U.S. PATENT DOCUMENTS

| | | | |
|---|---|---|---|
| 3,444,324 | 5/1969 | Dougan et al. | 179/2 DP |
| 3,793,487 | 2/1974 | Kilby | 179/6.1 |
| 3,927,264 | 12/1975 | Fish et al. | 179/6 E |
| 3,943,291 | 3/1976 | Okamura et al. | 179/6 E |
| 3,987,247 | 10/1976 | Fizer | 179/2 A |
| 4,006,316 | 2/1977 | Bolgiano | 179/2 A |
| 4,013,838 | 3/1977 | Tsai | 179/2 A |
| 4,122,305 | 10/1978 | Fish et al. | 179/6 E |
| 4,156,799 | 5/1979 | Cave | 179/6.15 |

Primary Examiner—Bernard Konick
Assistant Examiner—Randall P. Myers
Attorney, Agent, or Firm—Curtis, Morris & Safford

[57] ABSTRACT

A dial pulse restorer for receiving and restoring telephone dial pulses which may be distorted, and also for discriminating telephone-hang-up pulses which may be applied to a telephone line when a remote telephone coupled to the telephone line hangs up. A particular use for such a dial pulse restorer is to control the functions of dictation apparatus operatively coupled to one end of the telephone line in response to the operation of the dial mechanism at the remote telephone. The dial pulse restorer comprises a transition pulse generator for generating transition pulses in response to telephone pulse transitions that are received over the telephone line, such telephone pulse transitions being received either in response to telephone dial pulses or to a telephone hang-up pulse. A window generator is responsive to a transition pulse to generate a window pulse of predetermined duration and substantially centered on the expected time of occurrence of the next following transition pulse. A control pulse generator produces a control pulse in the event that the next-following transition pulse occurs during the window pulse duration; and a hang-up pulse detector indicates the receipt of a telephone hang-up pulse if a transition pulse does not occur during the window pulse duration.

19 Claims, 10 Drawing Figures

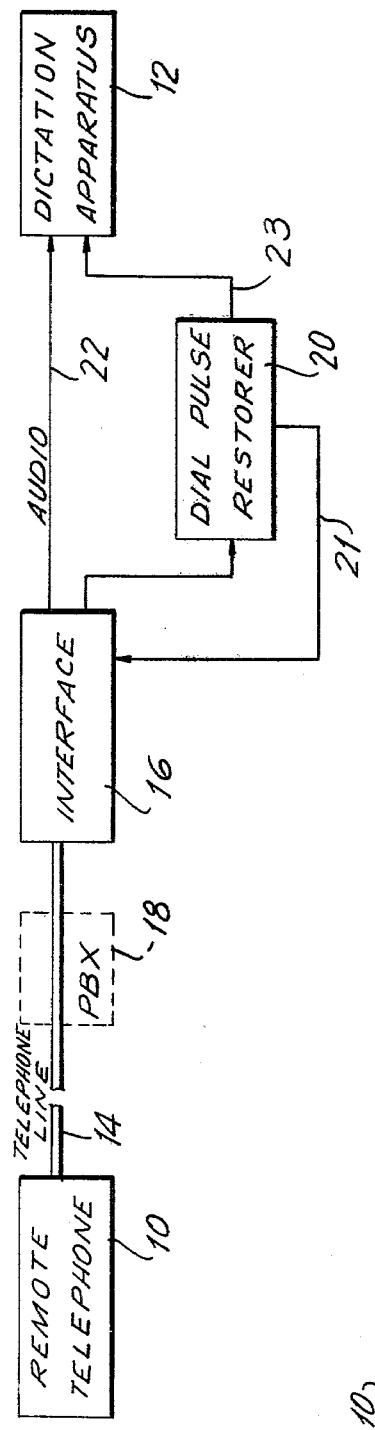

DIAL PULSE RESTORER

BACKGROUND OF THE INVENTION

This invention relates to a dial pulse restorer for receiving and restoring distorted telephone dial pulses and, more particularly, to such a dial pulse restorer which readily distinguishes between telephone dial pulses and a telephone hang-up pulse.

It is desirable and necessary, in various applications, to sense telephone dial pulses which may be applied to a telephone line, even though such telephone dial pulses may be distorted line, even though such telephone dial pulses may be distorted. One such application is the remote control of an operating device, such as dictation apparatus, from a remote telephone which is connected to that device via a conventional telephone line. In the environment of dictation apparatus, the various control functions of that apparatus, such as dictate, playback, rewind, fast forward, etc., conveniently can be controlled by a dictator from the remote telephone merely by dialing various predetermined numbers, each number being associated with a particular function.

In telephone systems which employ multi-frequency tones (the so-called Touch-Tone systems) for representing each dialed number, conventional tone detectors, or decoders, are provided at the site of the dictation apparatus for decoding each received Touch-Tone signal to a corresponding control signal whereby the particular function of the apparatus is performed. Generally, even if a conventional telephone line is subject to severe interference problems, these Touch-Tone signals nevertheless can be detected accurately. However, in telephone systems in which a dialed number is represented by a series of telephone dial pulses, such pulses may be significantly distorted, whereby they cannot be interpreted accurately. This disadvantage is aggravated further when a PBX system is connected between the telephone line and the dictation apparatus.

In a typical dial-pulse generator of the rotary-dial type commonly used on telephone instruments, the number of dial pulses which are generated is equal to the particular number which is dialed. Thus, one pulse is generated when a "1" is dialed, two pulses are generated when a "2" is dialed, and so on, up to ten generated pulses when a "0" is dialed. These pulses are of uniform shape, having a pulse width of 60 milliseconds and a period of 100 milliseconds, whereby these pulses are generated at the rate of 10 pulses per second. Because of distortion on the telephone line, telephone dial pulses which originate as rectangular pulses may be severely degraded such that only the positive and negative transitions of the original dial pulses are received. Such transitions are not sufficient to control the various functions of the dictation apparatus and, therefore, the original telephone dial pulses either must be reconstructed or simulated in response to the received transitions. Furthermore, it is important not to "lose" or "miss" a distorted dial pulse. For example, if six dial pulses (produced by dialing "6") controls one function and five dial pulses (produced by dialing "5") controls another function, an erroneous function will be performed if the user at a remote telephone dials "6" but, because of severe distortion, one of the six dial pulses is not detected.

In remotely controlling a device via the telephone line, it is important that the device be "disconnected" from the line when the remote telephone hangs up. In some telephone systems employing the so-called calling party control (CPC) technique, dial tone is applied to the telephone line when the calling party at the remote telephone hangs up. However, this CPC technique is not universally employed by all telephone operating companies. In some systems, a supervisory signal, such as a so-called hang-up pulse, is applied to the telephone line when the remote telephone hangs up. This hang-up pulse is known as the "click-disconnect" pulse. Although the click-disconnect pulse is not applied to the telephone line in all systems, in general, a pulse is transmitted over the telephone line when the remote telephone hangs up for practically all systems, including those which employ the CPC technique, those which employ the click-disconnect pulse technique, and others. It is important that such a hang-up pulse be discriminated from the usual dial pulses so as to avoid false operation of the dictation apparatus and, also, to assure that the dictation apparatus will be disconnected from the telephone line.

Apparatus for interpreting and decoding telephone dial pulses which are subject to severe distortion are known. One example of such apparatus is described in U.S. Pat. No. 3,444,324, issued May 13, 1969. As described in this patent, the dial pulse transition at the start of a telephone dial pulse is detected and used to generate a window pulse commencing at a time that is delayed by 30 milliseconds from such transition and which is centered upon the expected time of occurrence of the next following transition which represents the completion of the telephone dial pulse. If this second transition occurs during the window pulse, a flip-flop circuit is actuated, thus representing the receipt of a telephone dial pulse. If the window pulse is produced in response to a spurious telephone pulse, the flip-flop circuit is not actuated. While this patent describes a telephone dial pulse detector that can discriminate between dial pulses and spurious pulses, it is not capable of detecting or discriminating a hang-up pulse.

Other telephone dial pulse detecting apparatus proceeds under different principles of operation than that followed in the aforedescribed patent. For example, in U.S. Pat. No. 3,927,264, issued Dec. 16, 1975, telephone dial pulses are sensed on the basis of the amplitude of each received pulse. Initially, that is, prior to effecting control over a device from a remote telephone, a train of dial pulses is generated, such as by dialing "9". The pulses in this train are compared to a set of threshold levels. The highest threshold level which is exceeded by these pulses is used as a reference to detect whether subsequent pulses are true telephone dial pulses or merely spurious noise. The apparatus described in this patent also senses whether the spacing between successive pulses exceeds the standard for telephone dial pulses. Unfortunately, this apparatus is susceptible either to false triggering or to "missed" pulses in the event that conditions on the telephone line vary from the initial conditions that were present when the initial train of dial pulses was generated.

Another example of dial pulse detecting apparatus is described in U.S. Pat. No. 4,006,316, issued Feb. 1, 1977. In this patent, telephone dial pulses are detected on the basis of their frequency and timing intervals. Such a system is relatively complex and expensive to construct.

Yet another example of dial pulse detecting apparatus is described in Volume 18, No. 4, of the IBM Technical Disclosure Bulletin, September 1975, in the article entitled "Dial Pulse Detector" by Bringol et al. (pages 991–992), in which incoming pulses, both telephone dial pulses and spurious noise pulses, are counted. Depending upon the correlation between the number of counted pulses and an expected number, a determination is made as to whether the received pulses represent a dialed digit or merely are noise pulses. This apparatus also is relatively complex and expensive.

The use of dial pulse detecting apparatus in the environment of a dictation system is suggested, broadly, in Volume 14, No. 6 of the IBM Technical Disclosure Bulletin, dated Nov. 1971, in the article entitled "Control Device for the Operation of Dictation Units" by Diehl et al. (pages 1701–1702). This article, however, does not disclose the type of dial pulse detecting apparatus which is used.

In view of the aforenoted requirements of dial pulse detecting apparatus, and particularly, the ability of such apparatus to discriminate between telephone dial pulses which are distorted and hang-up pulses which also may be distorted, there is a need for improved dial pulse detecting apparatus, and particularly such apparatus which can be used to control the various functions of a dictation system.

OBJECTS OF THE INVENTION

Therefore, it is an object of the present invention to provide improved dial pulse restoring apparatus which satisfies the aforementioned need and which overcomes the aforenoted disadvantages of prior art devices.

Another object of this invention is to provide improved dial pulse restorer apparatus which readily discriminates between telephone dial pulses and a telephone hang-up pulse, all of such pulses being susceptible to distortion.

A further object of this invention is to provide an improved dial pulse restorer for controlling the functions of dictation apparatus from a remote telephone.

An additional object of this invention is to provide a dial pulse restorer which is capable of generating simulated telephone dial pulses in response to distorted dial pulses which are received via a telephone line, and which is capable of discriminating such dial pulses from a telephone hang-up pulse so as to respond to the latter to produce a disconnect pulse.

Yet another object of this invention is to provide improved dial pulse restoring apparatus which is of relatively simple and inexpensive construction.

Various other objects, advantages and features of the present invention will become readily apparent from the ensuing detailed description, and the novel features will be particularly pointed out in the appended claims.

SUMMARY OF THE INVENTION

In accordance with this invention, a dial pulse restorer is provided for receiving and restoring telephone dial pulses which may be distorted, and also for discriminating telephone hang-up pulses which may be applied to a telephone line when a remote telephone coupled to that line hangs up. This apparatus is capable of detecting telephone dial pulses which originate as substantially rectangular pulses, even if such pulses are received in highly distorted form. Transitions in such dial pulses are used to trigger a window pulse generator which generates a window pulse at a predetermined time after a transition is received, the window pulse having a duration which encompasses the expected time of occurrence of the next following transition which normally is included in a dial pulse. If the expected next following transition occurs during the window pulse, a simulated dial pulse is generated. The dial pulse restorer also functions to discriminate between received telephone dial pulses and a received telephone hang-up pulse. A hang-up pulse detector is responsive to the aforementioned window pulse for indicating the receipt of a telephone hang-up pulse if a simulated dial pulse is not generated within a predetermined interval following the window pulse. In a preferred embodiment, the hang-up pulse detector includes a timing circuit which is triggered by the window pulse to initiate a timeout interval, this timing circuit being reset if a simulated telephone dial pulse is generated. If the timing circuit is not reset, it completes its time-out interval, whereupon the transition pulse which resulted in the window pulse is perceived as a telephone hang-up pulse.

BRIEF DESCRIPTION OF THE DRAWINGS

The following detailed description, given by way of example, will best be understood in conjunction with the accompanying drawings in which:

FIG. 1 is a block diagram of a typical application of the dial pulse restorer in accordance with the present invention;

FIG. 2 is a partial logic, partial schematic diagram of a preferred embodiment of the present invention.

DETAILED DESCRIPTION OF A PREFERRED EMBODIMENT

Figure 3A:
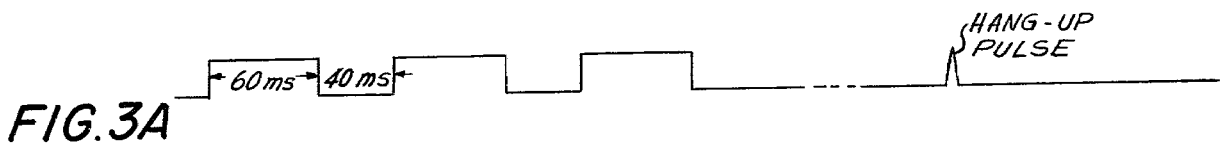
FIGS. 3A–3H are waveform diagrams representing the signals which are produced at various locations of the diagram illustrated in FIG. 2.

Referring now to the drawings, FIG. 1 is a block diagram representing a typical application of the dial pulse restorer of the present invention. In this application, dial pulse restorer 20 is utilized in the environment of a dictation system in which dictation apparatus, such as a dictating machine, is connected to one end of a telephone line 14, the other end of which is coupled to a remote telephone 10 from which dictation originates. The source of dictation, that is, remote telephone 10, must provide both audio signals corresponding to the dictated message, and control signals by which various functions of dictation apparatus 12 are controlled, such as the functions of "dictate", "playback", "rewind", "fast-forward", and the like. Each of these functions is controlled by dialing a particular digit at remote telephone 10, the representation of the dialed digit being effected by the number of telephone dial pulses which are generated. For example, the dialing of digit "2" may command dictation apparatus 12 to "stop". The dialing of digit "3" may command the apparatus to assume its "dictate" mode. The dialing of digit "4" may command dictation apparatus 12 to assume its "rewind" mode. Various other digits will, of course, command the apparatus into correspondingly different modes of operation.

In the application represented in FIG. 1, telephone line 14 connects remote telephone 10 to dictation apparatus 12 via a telephone interface circuit 16. This interface circuit is of conventional design and is adapted to "match" the various electrical parameters of the telephone line to the dictation apparatus without "loading" or damaging the telephone line and without damaging the dictation apparatus. Interface 16 also includes an audio channel, which may contain conventional audio amplifiers, to supply audio signals to an audio input 22 of dictation apparatus 12. Interface 16 also is provided with a dial pulse channel to couple the received telephone dial and hang-up pulses to dial pulse restorer 20. Suitable filter circuits may be included in interface 16 so as to separate the audio signals from the pulse signals received via telephone line 14.

A private branch exchange (PBX) unit 18 may be provided between telephone line 14 and interface 16. In that event, various branch extensions may be coupled to PBX apparatus 18, one of which branch extensions is terminated at interface 16. Those of ordinary skill in the art will appreciate that, with the addition of PBX apparatus 18, distorted dial pulses which are received from remote telephone 10 via telephone line 14 cannot readily be interpreted by the dial pulse control circuitry (not shown) of dictation apparatus 12. Dial pulse restorer 20 thus serves to reconstruct, or simulate, the received telephone dial pulses, and to supply such reconstructed or simulated telephone dial pulses to the dial pulse control circuitry of the dictation apparatus. Such dial pulse control circuitry is of conventional construction and, therefore, is not further described herein. Suffice it to say that the various functions of the dictation apparatus are selected by such dial pulse control circuitry in response to telephone dial pulses that, preferably, had been reconstructed or simulated by dial pulse restorer 20.

The dial pulse restorer includes a disconnect output 21 and a dial pulse output 23. As shown, the dial pulse is coupled to dictation apparatus 12 to supply dial pulses which have been reconstructed or simulated by the dial pulse restorer to the dial pulse control circuit of the dictation apparatus. Disconnect output 21 is connected to interface 16 and is adapted to control the interface to release telephone line 14 in response to a received telephone hang-up pulse, as will be described. To this effect, the interface may be provided with conventional telephone line terminating circuitry which, for example, may be solenoid controlled in response to an incoming ringing signal. This terminating circuitry effectively "seizes" telephone line 14 to provide a current terminating impedance to the line, whereby telephone communication is established from remote telephone 10 via the telephone line to interface 16 (optionally, via PBX apparatus 18), and thus to dictation apparatus 12. When telephone line 14 is released by remote telephone 10, as when the user at the remote telephone hangs up his handset, a telephone hang-up pulse is applied to the telephone line, this hang-up pulse being supplied to dial pulse restorer 20 via interface 16. The dial pulse restorer discriminates between this hang-up pulse and the usual telephone dial pulses, and in response to the hang-up pulse disconnects the terminating impedance by which interface 16 terminates telephone line 14. As is recognized, this causes the interface to release telephone line 14, thereby making dictation apparatus 12 available for a subsequent dictation operation initiated from the same or another remote telephone 10.

Turning now to FIG. 2, there is illustrated in partial logic, partial schematic form, a preferred embodiment of dial pulse restorer 20. Consistent with FIG. 1, the circuit diagram of FIG. 2 also includes a representation of remote telephone 10, telephone line 14 and interface 16. The audio channel of interface 16 is connected to dictation apparatus 12, as described above, and the dial pulse channel of the interface is connected to dial pulse restorer 20. The dial pulse restorer is comprised of a transition pulse generator 30, a window generator 40, a dial pulse generator 50 and a hang-up pulse discriminator 60. Transition pulse generator 30 is a conventional voltage rectifier-doubler which is adapted to rectify positive and negative transitions of a telephone dial pulse into transition pulses of fixed polarity, such as negative-going transition pulses. By making all transition pulses of uniform polarity, the remaining circuitry of dial pulse restorer 20 can be simplified in that positive and negative transition pulses need not be processed. Furthermore, the use of a voltage rectifier-doubler enables the dial pulse restorer to be operative with telephone systems in which telephone dial pulses are either positive-going pulses of 60 milliseconds duration or negative-going pulses of 60 milliseconds duration.

The voltage rectifier-doubler which constitutes transition pulse generator 30 is comprised of series-connected diodes 32 and 34 whose anode-cathode connection is coupled to interface 16 by a capacitor. Another capacitor 36 is connected in parallel with series-connected diodes 32 and 34, and a resistor is connected in parallel with this capacitor. The rectified, doubled voltage which is produced across capacitor 36 is coupled to the base electrode of a transistor 38 which, for example, may be an npn transistor. The collector electrode of transistor 38 is connected to window generator 40 and also to dial pulse generator 50. In the interest of simplification, the usual current-limiting resistors that normally are provided in circuit with transistor 38 are not shown. Similarly, and as described below, other transistors are illustrated in the absence of current-limiting resistors.

Window generator 40 is comprised of monostable multivibrators, or one-shot circuits, 42 and 44 connected in cascade. Monostable multivibrator 42 is adapted to be triggered from its stable state to its quasi-stable state in response to, for example, a negative transition pulse supplied thereto by transition pulse generator 30. This monostable multivibrator is adapted to establish a delay period following which monostable multivibrator 44 is triggered from its stable state to its quasi-stable state. When in its quasi-stable state, the output pulse produced by monostable multivibrator 44 functions as a window pulse and is supplied to dial pulse generator 50 and, also, to hang-up pulse discriminator 60. Still further, the output of monostable multivibrator 44 is fed back to an inhibit input 43 of monostable multivibrator 42 to inhibit this monostable multivibrator from responding to another transition pulse which may be supplied thereto by transition pulse generator 30. The purpose for inhibiting monostable multivibrator 42 during the window pulse duration will be explained below. In the preferred embodiment, the window pulse generated by monostable multivibrator 44 is of a duration that substantially encompasses the expected time of occurrence of a transition pulse, and is substantially centered on that expected time of occurrence. In a typical telephone system wherein the duration of a dial pulse is 60 milliseconds and the repetition period of the dial pulse is 100 milliseconds, the window pulse generated by monostable multivibrator 44 is substantially centered on a point of time that follows the commencement of the telephone dial pulse by 60 milliseconds. In the preferred embodiment, monostable multivibrator 42 exhibits a time constant of 45 milliseconds and monostable multivibrator 44 exhibits a time constant of 30 milliseconds.

Dial pulse generator 50 is adapted to sense if a transition pulse is generated by transition pulse generator 30 during a window pulse. To this effect, dial pulse generator 50 is comprised of a pair of NAND gates 54 and 56, each having one input connected in common to a logic inverter 52, the latter being connected to the output of monostable multivibrator 44 to invert the logical sense of the window pulse generated by this monostable multivibrator. The other input of NAND gate 54 is connected to the collector electrode of transistor 38, and the other input of NAND gate 56 is connected to the output of NAND gate 54. Another monostable multivibrator 58 is connected to the output of NAND gate 56 and is triggered from its stable state to its quasistable state in the event that a transition pulse is produced during a window pulse. Monostable multivibrator 58, which also may be a conventional one-shot circuit, is adapted to produce a simulated version of a telephone dial pulse. Since a conventional telephone dial pulse, as mentioned above, has a pulse duration of 60 milliseconds, the time constant of monostable multivibrator 58 is equal to 60 milliseconds. The output of this monostable multivibrator, sometimes referred to herein as a simulated dial pulse, is connected to an output transistor 59, which may be a pnp transistor, and also to hang-up pulse discriminator 60. Transistor 59 may serve as a buffer amplifier to supply the simulated dial pulses to dial pulse output 23 and, thence, to the dial pulse control circuit of dictation apparatus 12 (FIG. 1).

Hang-up pulse discriminator 60 is comprised of a latching circuit formed of NAND gate 62 and logic inverter 64. NAND gate 62 has one input connected to the output of monostable multivibrator 58 and another input connected to the output of monostable multivibrator 44. The output of NAND gate 62 is fed back via logic inverter 64 to the same input thereof to which monostable multivibrator 58 is connected. Resistors are connected between this input of NAND gate 62 and each of monostable multivibrator 58 and logic inverter 64 so as to avoid undesirable loading in the event that the logic signals produced by these respective circuits differ. The output of NAND gate 62 is further connected to a timing circuit which, in the illustrated preferred embodiment, includes capacitor 66. It may be appreciated that, if desired, the timing circuit may be constructed of other, conventional timing devices, such as a clock circuit and clock-pulse counter. The voltage across capacitor 66 is supplied, via a logic inverter 68, to a transistor 69, shown herein as a pnp transistor. The collector electrode of this transistor is connected to disconnect output 21 which, as shown in FIG. 1, is coupled to interface 16. As will be described, a disconnect pulse supplied to disconnect output 21 serves to effectively disconnect interface 16 from telephone line 14.

The operation of dial pulse restorer 20 now will be described, with specific reference to the waveform diagrams shown in FIGS. 3A–3H. Initially, telephone dial pulses which originate at remote telephone 10 appear as the rectangular waveform shown in FIG. 3A. These dial pulses, appearing at output A of the remote telephone, are generated at the rate of ten pulses per second, and thus have a period of 100 milliseconds. The pulse duration of each dial pulse extends for 60 milliseconds and, therefore, each dial pulse has a duty cycle of 60%. FIG. 3A also shows a hang-up pulse which may be applied to telephone line 14 when remote telephone 10 returns to an on-hook condition, that is, when the remote telephone hangs up. As mentioned hereinabove, this hang-up pulse may be generated in a CPC system, or as a click-disconnect pulse, or as a spurious pulse which is applied to the telephone line directly in response to a hang-up condition.

Figure 3B:
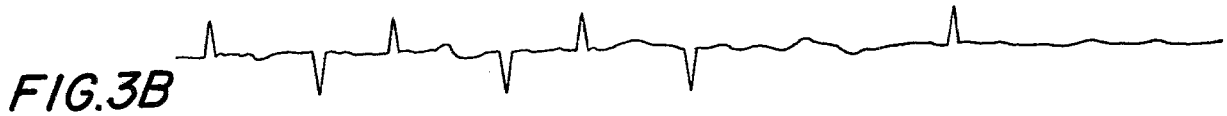

Because of noise and other deleterious conditions on telephone line 14, the ideal rectangular waveform shown in FIG. 3A may be distorted. As a result of such distortion, the telephone dial pulses which are received at input B of interface 16 via telephone line 14 may appear as shown in FIG. 3B. A comparison between FIGS. 3A and 3B indicates that all that remains of the original telephone dial pulses are the positive-going and negative-going transitions therein. It has been assumed that each dial pulse is a positive-going pulse and, therefore, a positive transition is provided at its leading edge and a negative transition is provided at its trailing edge. Alternatively, the dial pulse may be a negative-going pulse, resulting in a negative transition at its leading edge and a positive transition at its trailing edge. The particular polarity of these transitions is rectified by transition pulse generator 30 which, in the present example, generates a negative-going transition pulse in response to each leading-edge or trailing-edge transition receivied by interface 16, as shown in FIG. 3B. In addition, since transition pulse generator 30 is formed of a voltage rectifier-doubler, the magnitude of each dial pulse transition, as received at input B of interface 16, is doubled. The transition pulses which are generated by transition pulse generator 30 are derived at the collector of transistor 38, and appear as the negative-going transition pulses shown in FIG. 3C.

Figure 3C:

From FIG. 3C, it is appreciated that each pair of transitions which defines a telephone dial pulse, that is, the positive and negative transitions which define such a pulse, are rectified to be of uniform polarity, e.g., negative-going transition pulses. Also, the hang-up pulse which is applied to telephone line 14 as a single pulse, also is rectified so as to be a negative-going transition pulse. Of course, although each pair of transition pulses defines a telephone dial pulse, the single transition pulse shown in FIG. 3C represents a hang-up pulse.

The transition pulses generated by transition pulse generator 30, and shown in FIG. 3, are supplied to monostable multivibrator of window generator 40. The first transition pulse of a pair of dial-pulse-defining transition pulses triggers this monostable multivibrator to its quasi-stable state, as shown in FIG. 3D. More particularly, at output D of this monostable multivibrator, the voltage level undergoes a transition from its relatively high level, that is, the level normally produced when monostable multivibrator 42 assumes its stable state, to a relatively lower level. This relatively lower level subsists for the time constant period of the monostable multivibrator, assumed herein to be 45 milliseconds in the present example. At the completion of this time constant interval, that is, at the completion of 45 milliseconds, monostable multivibrator 42 returns to its stable state; and output D returns from its relatively lower level to its relatively higher level, as shown in FIG. 3D. This positive transition at output D of the monostable multivibrator triggers monostable multivibrator 44 to its quasi-stable state, whereupon output E thereof undergoes a transition from its relatively higher level to its relatively lower level, as shown in FIG. 3E.

When monostable multivibrator 44 is in its quasi-stable state, the relatively lower level at output E is fed back to inhibit input 43 of monostable multivibrator 42. This, effectively, inhibits monostable multivibrator 42 from responding to another negative-going transition pulse which may be supplied thereto during the interval that monostable multivibrator 44 is in its quasi-stable state. As can be seen from FIGS. 3C and 3E, while monostable multivibrator 42 is in its stable state and monostable multivibrator 44 is in its quasi-stable state, the second transition pulse in the dial-pulse-defining pair occurs. However, monostable multivibrator 42 is inhibited from responding thereto.

Figure 3D:
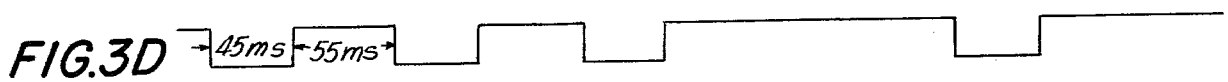
Figure 3E:
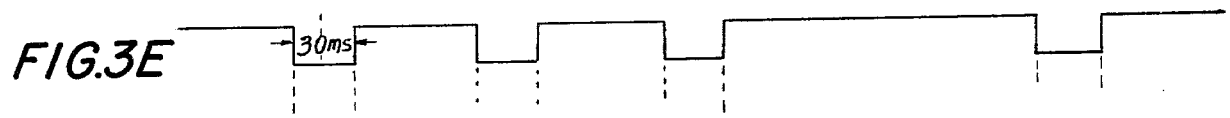

At the completion of the time constant of monostable multivibrator 44, assumed herein to be 30 milliseconds in the present example, the monostable multivibrator returns to its stable state, whereupon output E undergoes a transition from its relatively lower level to its relatively higher level, as shown in FIG. 3E. The negative-going pulse produced at output E (FIG. 3E) in response to the first transition pulse of the dial-pulse-defining pair of transition pulses is referred to as the window pulse. It is appreciated that this window pulse is centered on the expected time of occurrence of the second dial-pulse-defining transition pulse, and has a time duration which encompasses that second transition pulse, even if the latter experiences a relatively minor displacement in its time of occurrence. Preferably, the window pulse has a duration of 30 milliseconds, and commences at a time that is delayed from the first dial-pulse-defining transition pulse by 45 milliseconds. It is seen that the time duration of the window pulse may be modified, as described, by adjusting the time constant of monostable multivibrator 44; and its time of occurrence may be modified, as desired, by adjusting the time constant of monostable multivibrator 42. Such modifications may be made in order to accommodate the particular pulse duration of the telephone dial pulses, as well as the dial pulse repetition frequency, of individual telephone systems.

From FIGS. 3D and 3E, it is seen that monostable multivibrator 42 responds only to the first dial-pulse-defining transition pulse of a pair of transition pulses, and is inhibited from responding to the second transition pulse. Thus, this monostable multivibrator is triggered only in response to the leading edge of a telephone dial pulse. This insures that the window pulse shown in FIG. 3E is produced only to encompass the expected time of occurrence of the trailing edge of the telephone dial pulse.

The window pulse of FIG. 3E, produced at output E of monostable multivibrator 44, is inverted by logic inverter 52 to enable AND gate 54 to pass, or gate, the second dial-pulse-defining transition pulse, that is, the transition pulse which is generated in response to the trailing edge of the telephone dial pulse. NAND gate 54 thus supplies the logically-inverted version of the negative-going transition pulse, that is, a positive transition pulse, to NAND gate 56. NAND gate 56 also is enabled by the inverted window pulse which is supplied thereto by logic inverter 52 so as to supply a negative-going pulse to monostable multivibrator 58. Thus, NAND gates 54 and 56 cooperate to function as a logic AND gate, and these two circuit elements may be replaced by a single AND, if desired.

Figure 3F:

Monostable multivibrator 58 responds to the transition pulse which is gated thereto by NAND gates 54 and 56 to be triggered from its stable state to its quasi-stable state. This results in a transition at output F thereof from a relatively lower level to a relatively higher level, as shown in FIG. 3F. Output F of this monostable multivibrator remains at its relatively higher level for the duration of the pre-established time constant of monostable multivibrator 58. In the present example, since the pulse duration of each telephone dial pulse is assumed to be equal to 60 milliseconds, the time constant of monostable multivibrator 58 is selected to be 60 milliseconds, such that the pulse produced at output F (shown in FIG. 3F) is a simulated dial pulse of a duration which is substantially equal to the duration of the original telephone dial pulse. This output pulse produced by the monostable multivibrator is sometimes referred to herein as a simulated dial pulse or as a control pulse. The simulated dial pulse (or control pulse) is supplied via buffer transistor 59 to dial pulse output 23 for application to dictation apparatus 12 (FIG. 1). The usual dial pulse control circuitry included in dictation apparatus 12 thus responds to the simulated dial pulses (or control pulses) which are produced by monostable multivibrator 58 to establish a corresponding control function for the dictation apparatus, as selected by the operator located at remote telephone 10. Thus, it is seen that if the operator dialed "5", five telephone dial pulses are generated at output A of remote telephone 10. These telephone dial pulses are distorted over telephone line 14, and only the leading and trailing edges thereof are received at input B of interface 16, as shown in FIG. 3B. These leading and trailing edges, or transitions, are converted to pulse transitions by pulse transition generator 30, all of uniform polarity and amplitude. The first dial-pulse-defining transition pulse corresponding to the leading edge of a telephone dial pulse triggers monostable multivibrator 42 which, in turn, triggers monostable multivibrator 44 to produce the window pulse illustrated in FIG. 3E. This window pulse enables NAND gates 54 and 56 to gate the next-following transition pulse, corresponding to the trailing edge of a telephone dial pulse, to monostable multivibrator 58. This, in turn, triggers the monostable multivibrator to produce the simulated dial pulse (or control pulse) shown in FIG. 3F.

Each window pulse (FIG. 3E) at output E of monostable multivibrator 44 is supplied to NAND gate 62. From FIG. 3E, it is seen that, prior the commencement of the window pulse, NAND gate 62 is supplied with a relatively higher level from output E. Let it be assumed that the other input of this NAND gate also is supplied, normally, with a relatively higher level. Consequently, the output of NAND gate 62 is at a relatively lower level, this level being logically inverted by logic inverter 64 and fed back as a higher level to the NAND gate. The input to which this relatively higher level is fed back is the same input that is connected to output F of monostable multivibrator 58. Although the monostable multivibrator normally is at its lower level, as shown in FIG. 3F, the resistor which is connected between output F and the input of NAND gate 62 and the resistor which is connected between the output of logic inverter 64 and the input of this NAND gate function as an OR circuit. Thus, if either the output of logic inverter 64 or the output F is at a relatively higher level, NAND gate 62 is supplied with a relatively higher level.

Figure 3G:
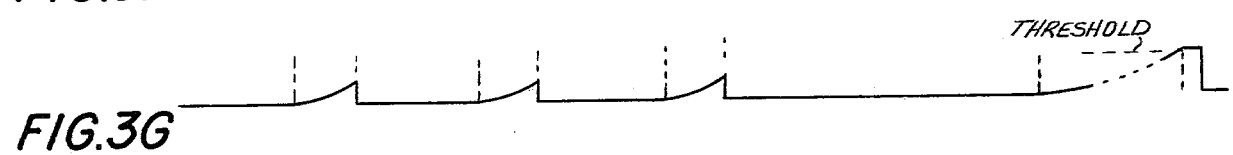

The output of NAND gate 62 normally is at a relatively lower level because output E normally is provided with a relatively higher level and inverter 64 normally feeds back a relatively higher level, as mentioned above, so that capacitor 66 normally remains discharged. This is represented in FIG. 3G which illustrates the signal produced at point G across capacitor 66. Now, when the window pulse is generated, the relatively lower level which is produced at output E of monostable multivibrator 44 results in a relatively higher level at the output of NAND gate 62. This higher level commences to charge capacitor 66 so that the voltage at point G gradually increases, as shown in FIG. 3G. If the window pulse had been produced in response to the leading edge of the telephone dial pulse, then the trailing edge of that dial pulse, as received at interface 16, results in the generation of the simulated dial pulse at output F of monostable multivibrator 58, as shown in FIG. 3F. When the window pulse terminates, points E and F both are at their relatively higher levels, as shown in FIGS. 3E and 3F. This results in a relatively lower level at the output of NAND gate 62 so as to discharge capacitor 66, as shown in FIG. 3G. Thus, it is seen that NAND gate 62 functions as a charging circuit to charge capacitor 66 in response to the commencement of each window pulse, and to discharge this capacitor in the event that a transition pulse is generated by transition pulse generator 30 during the window pulse.

Figure 3H:

When a hang-up pulse transition is received at input B of interface 16 (FIG. 3B), transition pulse generator 30 nevertheless generates a transition pulse in response thereto, as shown in FIG. 3C. This single transition pulse triggers monostable multivibrator 42 to its quasi-stable state which, in turn, triggers monostable multivibrator 44 to produce the window pulse shown at the right-hand side of FIG. 3E. Of course, transition pulse generator 30 does not generate another transition pulse during this window pulse. Consequently, monostable multivibrator 58 properly is not triggered to produce a simulated dial pulse. However, the commencement of the window pulse actuates NAND gate 62 to charge capacitor 66, as shown at the right-hand side of FIG. 3G. The capacitor is charged because the output of NAND gate 62 is at a relatively higher level. This higher level output is inverted by logic inverter 64 and fed back as a lower level to the NAND gate. When the window pulse terminates, output E of monostable multivibrator 44 is supplied at a relatively higher level to one input of NAND gate 62. However, at this time, since monostable multivibrator 58 had not been triggered, output F thereof remains at its relatively lower level. Also, the output of logic inverter 64 is at its relatively lower level. Consequently, the other input of NAND gate 62 remains at its relatively lower level at the completion of the window pulse. Hence, NAND gate 62 is "latched" to produce a high level at the output thereof even after the window pulse terminates. Accordingly, the charging of capacitor 66 continues until this capacitor is charged beyond a predetermined threshold level. The capacitance of capacitor 66 and the resistance of the resistor which connects the output of NAND gate 62 thereto may be selected to have a time constant on the order of about two seconds. This means that, at the end of two seconds following the commencement of charging capacitor 66, the voltage thereacross exceeds the predetermined threshold. This capacitor voltage at point G, which now is at a relatively higher level, is inverted by inverter 68 to trigger transistor 69 to its conducting state, resulting in a negative-going disconnect pulse at output H, as shown in FIG. 3H. This disconnect pulse is supplied to disconnect output 21, and is applied to interface 16 so as to disconnect the termination which had been applied to telephone line 14 by the interface. Thus, telephone line 14 is released, and interface 16 returns to an "on-hook" condition. As a result of this on-hook condition, capacitor 66 is reset by conventional means (not shown) to return dial pulse restorer 20 to its initial, stand-by condition. As an alternative, a separate reset circuit may be provided across capacitor 66, this reset circuit being responsive to the disconnect pulse shown in FIG. 3H to reset the capacitor abruptly.

From the foregoing discussion of the operation of hang-up pulse discriminator 60, it is appreciated that, when telephone dial pulses are transmitted from remote telephone 10 via telephone line 14 to interface 16, the generation of the transition pulse which represents the leading edge of the telephone dial pulse results in the charging of capacitor 66, and the next-following transition pulse, which represents the negative transition of the telephone dial pulse, resets the capacitor. In the absence of a next-following transition pulse, as when a hang-up pulse is received, capacitor 66 is not discharged and, therefore, continues to charge beyond the predetermined threshold level. Once this threshold level is exceeded, transistor 69 is rendered conductive to produce the disconnect pulse shown in FIG. 3H.

While the present invention has been particularly shown and described with reference to a preferred embodiment thereof, and in the environment of a particular application, it should be readily appreciated by those of ordinary skill in the art that various changes and modifications in form and details may be made without departing from the spirit and scope of the invention. For example, the latching circuit formed of NAND gate 62 and logic inverter 64 may be replaced by a flip-flop circuit which is set by the window pulse and which is reset by the simulated dial pulse. Capacitor 66 will be charged when this flip-flop circuit is set and will be discharged when this flip-flop circuit is reset. As another alternative, the timing circuit formed of capacitor 66 may be replaced by other conventional timing circuits, such as a clock pulse generator and counter, as mentioned above. With this arrangement, the counter is incremented by the clock pulses in response to the commencement of the window pulse, and the counter is reset to an initial count in response to the simulated dial pulse. Also, other conventional logic circuits may be used in place of the illustrated NAND gates and logic inverters, as are well known to those of ordinary skill in the art. Similarly, other timing circuits and pulse generators may be used in place of monostable multivibrators 42 and 44 to produce the window pulse shown in FIG. 3E. It is, therefore, intended that the appended claims be interpreted as including the foregoing as well as other such changes and modifications.

What is claimed is:

1. A dial pulse restorer for receiving and restoring telephone dial pulses which may be distorted, and also for discriminating telephone hang-up pulses which may be applied to a telephone line when a remote telephone coupled to said telephone line hangs up, said telephone dial pulses originating as substantially rectangular pulses defined by pairs of transitions, said dial pulse restorer comprising:
    means for receiving at least the pairs of transitions defining each dial pulse and a single transition representing the hang-up pulse;
    shaping means for shaping said transitions;
    window generating means coupled to said shaping means and responsive to the first transition of a pair of transitions to generate a window pulse having a duration encompassing the expected time of occurrence of the second transition of said pair of transitions;

pulse generating means coupled to said window generating means and enabled by said window pulse and responsive to said second transition to generate a simulated dial pulse of predetermined duration if said second transition is received during said window pulse; and hang-up pulse discriminating means coupled to said window generating means to produce a disconnect pulse if a transition is not received during said window pulse.

2. The dial pulse restorer of claim 1 wherein said hang-up pulse discriminating means includes a timing circuit triggered by said window pulse to time-out at a predetermined time unless a transition is received prior to said predetermined time; and latch means having one input connected to receive said window pulse and another input connected to said pulse generating means to receive said simulated dial pulse, said latch means responding to said window pulse to exhibit a latched condition and thereby trigger said timing circuit and said latched condition being cleared at the termination of said window pulse if said simulated dial pulse is generated and thereby reset said timing circuit.

3. The dial pulse restorer of claim 2 wherein said timing circuit comprises capacitance means that is charged in response to the latched condition of said latch means and discharged in response to the cleared condition of said latch means.

4. The dial pulse restorer of claim 3 wherein said hang-up pulse discriminating means further comprises disconnect pulse generating means for producing said disconnect pulse if said capacitance means is charged in excess of a predetermined threshold level.

5. The dial pulse restorer of claim 4 wherein said disconnect pulse generating means comprises a transistor.

6. The dial pulse restorer of claim 4 wherein said latch means comprises a NAND gate having one input for receiving said window pulse, another input for receiving said simulated dial pulse and an output coupled to said capacitance means; and a logic inverter connected in feedback relation between said output of said NAND gate and said other input thereof.

7. The dial pulse restorer of claim 1 wherein said window generating means comprises rectifier means for rectifying the received transitions to uniform polarity; first monostable multivibrator means responsive to the first rectified transition to produce a first pulse signal whose duration is less than the expected time separation between the first and second rectified transitions; and second monostable multivibrator means responsive to the termination of said first pulse signal for generating said window pulse, the output of said second monostable multivibrator means being operative to inhibit said first monostable multivibrator means from responding to another rectified transition during the duration of said window pulse.

8. The dial pulse restorer of claim 7 wherein said pulse generating means comprises gate means conditioned by said window pulse to pass a rectified transition that is received during the duration of said window pulse; and third monostable multivibrator means responsive to a rectified transition passed by said gate means to generate said simulated dial pulse.

9. The dial pulse restorer of claim 8 wherein the original dial pulses have a duration of 60 milliseconds, and a period of 100 milliseconds, wherein the duration of the first pulse signal produced by said first monostable multivibrator means is on the order of 45 milliseconds, and wherein the duration of said window pulse is on the order of 30 milliseconds.

10. The dial pulse restorer of claim 8 wherein said window pulse is substantially centered on the expected time of occurrence of said second rectified transition.

11. A dial pulse restorer for controlling the functions of dictation apparatus operatively coupled to one end of a telephone line in response to telephone dial pulses which originate from a remote telephone that is connected to the other end of said telephone line and for disconnecting said dictation apparatus from said telephone line when said remote telephone hangs up, said dial pulse restorer comprising:

means for generating transition pulses in response to telephone pulse transitions that are received over said telephone line, a pair of said telephone pulse transitions defining a telephone dial pulse and a single telephone pulse transition representing a hang-up pulse that is applied to said telephone line when said remote telephone hangs up;

window generating means responsive to the first transition pulse of a pair of transition pulses to generate a window pulse of predetermined duration and substantially centered on the expected time of occurrence of the second transition pulse of said pair;

control pulse generating means coupled to said window generating means and to said means for generating transition pulses, and responsive to a transition pulse that is generated during said window pulse duration to produce a control pulse for use in said dictation apparatus; and means for disconnecting said dictation apparatus from said telephone line in response to said window pulse if a transition pulse is not generated during said window pulse duration.

12. The dial pulse restorer of claim 11 wherein said means for disconnecting comprises timing means triggered by said window pulse to commence the timing of a predetermined interval and to generate a disconnect pulse at the completion of said interval to disconnect said dictation apparatus from said telephone line, said timing means ceasing said timing of said predetermined interval if a transition pulse is generated during said window pulse duration.

13. The dial pulse restorer of claim 12 wherein said timing means comprises capacitance means; charging means responsive to the initiation of said window pulse for charging said capacitance means toward a threshold level, said charging means terminating the charging of said capacitance means if a transition pulse is generated during said window pulse duration; and output means for generating said disconnect pulse if said capacitance means is charged to said threshold level.

14. The dial pulse restorer of claim 13 wherein said charging means comprises a NAND gate having one input connected to receive said window pulse, another input connected to receive said control pulse and an output coupled to said capacitance means, whereby the charging of said capacitance means commences when said window pulse is received at said one input and the charge across said capacitance means is reset at the completion of said window pulse if said control pulse then is received at said other input; and inverter means for feeding back an inverted version of the signal at said output of said NAND gate to said other input.

15. Apparatus for discriminating between telephone dial pulses and a telephone hang-up pulse applied to a telephone line, said telephone dial and hang-up pulses being susceptible to distortion such that at least the transitions that define said telephone dial pulse and the transition that defines said telephone hang-up pulse are received by said apparatus, comprising:
- shaping means for shaping the received transitions;
- window pulse generating means coupled to said shaping means and responsive to a transition for generating a window pulse at a predetermined time after said transition and of a duration encompassing the expected time of occurrence of the next following transition;
- means for generating a simulated telephone dial pulse if a transition occurs during said window pulse; and
- hang-up pulse detecting means responsive to a generated window pulse for indicating the receipt of a telephone hang-up pulse at a time delayed from said window pulse if a simulated telephone dial pulse is not generated during the time delay interval.

16. The apparatus of claim 15 wherein said hang-up pulse detecting means comprises timing means triggered by said window pulse to initiate a time-out interval, said timing means being reset if a simulated telephone dial pulse is generated; and means responsive to the completion of said time-out interval to indicate the receipt of a telephone hang-up pulse.

17. The apparatus of claim 16 wherein said timing means comprises capacitance means and circuit means for charging said capacitance means in response to said window pulse and for discharging said capacitance means in response to a simulated telephone dial pulse.

18. The apparatus of claim 17 wherein said means to indicate the receipt of a telephone hang-up pulse is responsive to the charging of said capacitance means beyond a predetermined threshold level.

19. The apparatus of claim 18 wherein said circuit means comprises a NAND gate having one input connected to receive said window pulse, another input connected to receive said simulated telephone dial pulse and an output connected in charging relation to said capacitance means; and a logic inverter connected in feedback relation between said output and said other input of said NAND gate.

* * * * *